US008395714B2

(12) United States Patent
Lescure et al.

(10) Patent No.: US 8,395,714 B2
(45) Date of Patent: Mar. 12, 2013

(54) SCANNED PROJECTION SYSTEM USING POLYMERIZED LIQUID CRYSTAL LAYER FOR SPECKLE REDUCTION

(75) Inventors: Alban N. Lescure, Redmond, WA (US); Markus Duelli, Seattle, WA (US); Mark O. Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 799 days.

(21) Appl. No.: 12/554,095

(22) Filed: Sep. 4, 2009

(65) Prior Publication Data
US 2010/0265420 A1 Oct. 21, 2010

Related U.S. Application Data

(63) Continuation-in-part of application No. 12/424,951, filed on Apr. 16, 2009, now Pat. No. 8,049,825.

(51) Int. Cl.
G02F 1/1335 (2006.01)
G02F 1/1333 (2006.01)
G02F 1/13 (2006.01)
(52) U.S. Cl. ............... 349/5; 349/86; 349/196; 349/202
(58) Field of Classification Search ................. 349/5, 86, 349/196, 202
See application file for complete search history.

(56) References Cited

U.S. PATENT DOCUMENTS

| 6,175,398 | B1 | 1/2001 | Yamada et al. |
| 6,493,055 | B1 * | 12/2002 | Shimoshikiryo et al. ..... 349/141 |
| 2003/0142288 | A1 | 7/2003 | Kinrot et al. |
| 2007/0153235 | A1 | 7/2007 | Morikawa et al. |
| 2008/0158513 | A1 | 7/2008 | Bartlett et al. |
| 2009/0034041 | A1 | 2/2009 | Grasser |
| 2009/0046548 | A1 | 2/2009 | Katayama |
| 2009/0161072 | A1 | 6/2009 | Yamauchi et al. |
| 2010/0079848 | A1 | 4/2010 | Grasser et al. |
| 2011/0037953 | A1 | 2/2011 | Nizani et al. |

OTHER PUBLICATIONS

Dingel, Benjamin et al., "Speckle-Free Image in a Laser Diode Microscope by Using the Optical Feedback Effect", *Optical Letters*, vol. 18, No. 7. Apr. 1, 1993 , 549-551.
Jones, R. J. et al., "Influence on External Cavity Length on the Coherence Collapse Regime in Laser Diodes Subject to Optical Feedback", *IEE Proc-Optoelectron*, vol. 148, No. 1 Feb. 1, 2001 , 7-12.
Trisnadi, Jahja I. et al., "Speckle Contrast Reduction in Laser Projection Displays", *SPIE* vol. 4657 Apr. 26, 2002.
Volker, A.C. et al., "Laser Speckle Imaging with An Active Noise Reduction Scheme", *Optics Express*, vol. 13, No. 24, Nov. 15, 2005. 9782-9787.
Woodward, S. L. et al., "The Onset of Coherence Collapse in DBR Lasers", *IEEE Photonics Technoloy Letters*, vol. 2 No. 6 Jun. 1, 1990, 391-394.

* cited by examiner

*Primary Examiner* — Edward Glick
*Assistant Examiner* — David Chung
(74) *Attorney, Agent, or Firm* — Kevin D. Wills

(57) ABSTRACT

An imaging system (200), such as a scanned laser projection system, includes one or more laser sources (201) configured to produce one or more light beams (204), and a light modulator (203) configured to produce images (206) from the light beams (204). Optional optical alignment devices (220) can be used to orient the light beams (204) into a combined light beam (205). A beam separator (221), which can be any of a birefringent wedge, compensated birefringent wedge, or a polymerized liquid crystal layer, is disposed between at least one of the laser sources (201) and the light modulator (203). The beam separator (221) is configured to receive light from the laser sources (201) and deliver two angularly separated and orthogonally polarized light beams (223) to the light modulator (203) so as to reduce speckle appearing when the images (206) are displayed on a display surface (207).

15 Claims, 13 Drawing Sheets

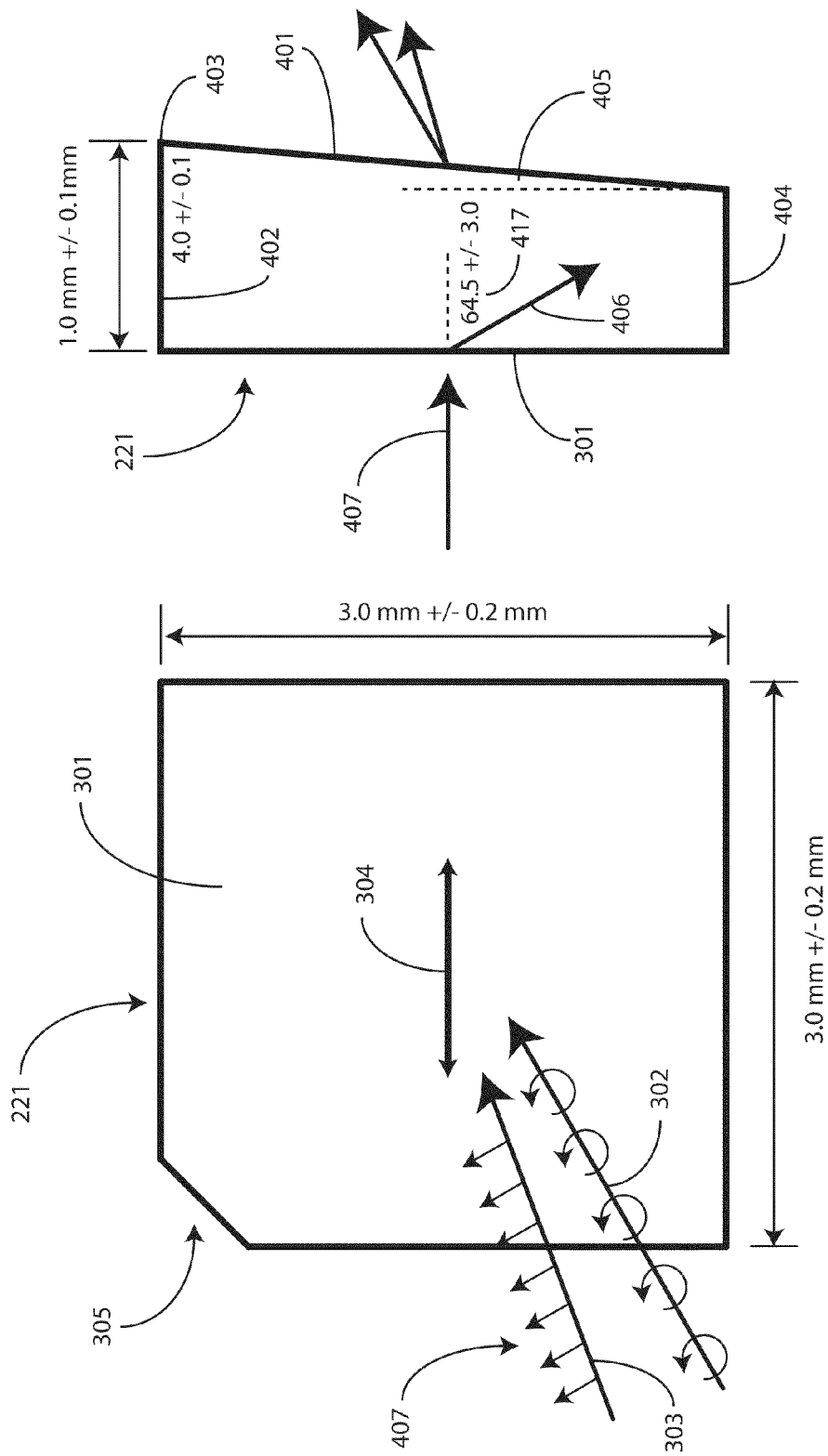

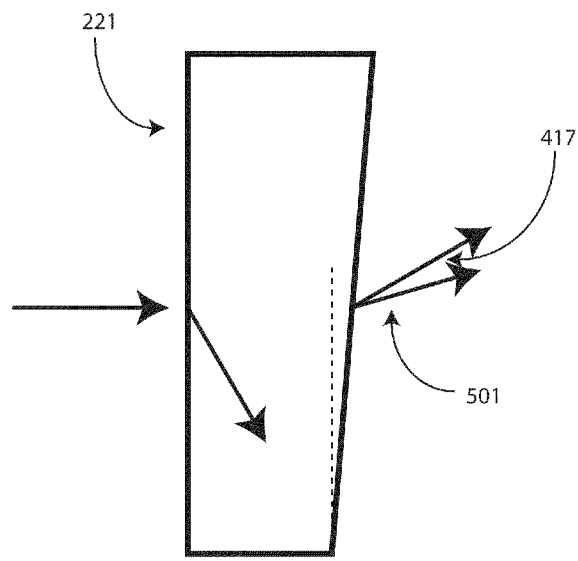
FIG. 5
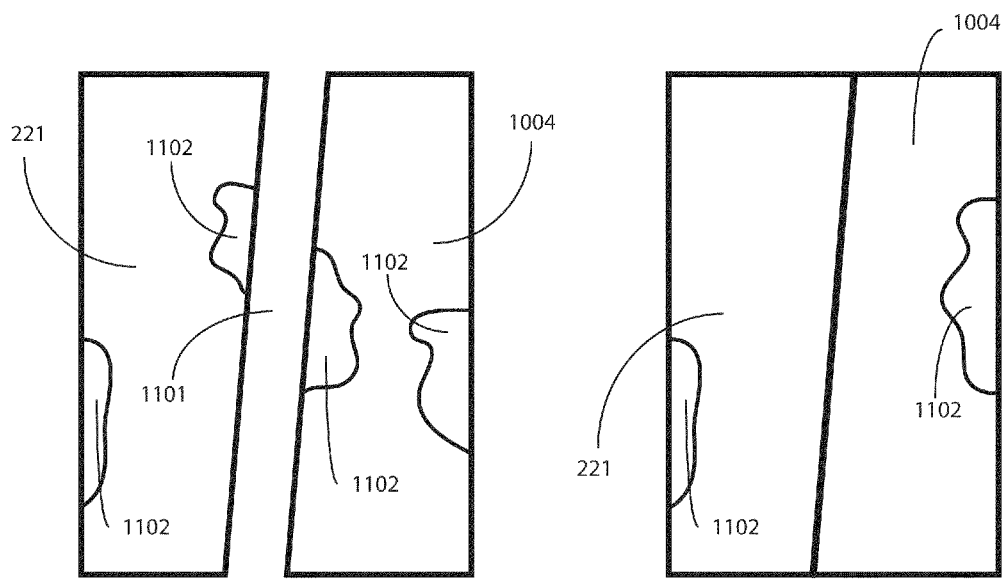
FIG. 11   FIG. 12

SCANNED PROJECTION SYSTEM USING POLYMERIZED LIQUID CRYSTAL LAYER FOR SPECKLE REDUCTION

CROSS-REFERENCE TO RELATED APPLICATIONS

The present application is a continuation-in-part of U.S. patent application Ser. No. 12/424,951 filed Apr. 16, 2009 and is hereby incorporated by reference in its entirety.

BACKGROUND

1. Technical Field

This invention relates generally to optical projection systems configured to reduce perceived speckle, and more particularly to a laser-based system employing a beam separator in the optical path of one or more lasers to create angularly separated and orthogonally polarized beams from a single laser prior to forming an image, thereby reducing speckle perceived by a viewer.

2. Background Art

Laser projection devices facilitate the production of brilliant images created with vibrant colors. The image quality associated with laser-based projection systems is unmatched by systems using conventional projection devices. The advent of semiconductor lasers, such as laser diodes, allows these brilliant images to be created by a compact projector, at a reasonable cost, and while consuming small amounts of power. Laser diodes are small, compact, and relatively inexpensive. Further, the light from laser diodes is easily modulated to form bright, complex images.

One practical drawback associated with using lasers in projection systems is the image artifact known as "speckle." Speckle occurs when a coherent light source is projected onto a randomly diffusing surface. As the light is highly coherent, when it reflects off a rough surface, components of the light combine with other components to form patches of higher intensity light and lower intensity light. In a detector with a finite aperture, such as a human eye, these varied patches of intensity appear as speckles, as some small portions of the image look brighter than other small portions. Further, this spot-to-spot intensity difference can vary depending on observer's position, which makes the speckles appear to change when the observer moves.

Turning now to FIG. 1, illustrated therein is a prior art system 100 in which an observer 102 may perceive speckle. Specifically, a coherent light source 101, such as a semiconductor-type or standard laser, delivers a coherent beam 104 to a modulation device 103. The modulation device 103 modulates the coherent beam 104 into a modulated coherent beam 105 capable of forming an image. This modulated coherent beam 105 is then delivered to a projection medium, such as the projection screen 107 shown in FIG. 1.

As the projection screen 107 surface has a random roughness, i.e., as it includes tiny bumps and crevices that are randomly distributed, the reflected light 108 has portions that combine and portions that cancel. As a result, the observer 102 views an image 106 that appears to be speckled. The presence of speckle often tends to perceptibly degrade the quality of the image produced using the laser projection system.

Numerous attempts have been made to control speckle. Prior art speckle reduction systems employ diffusers, image displacing devices, and other complex systems. Some speckle reduction systems, such as those used with microscopes, employ long lengths of optical fiber in an attempt to induce mode mixing prior to delivering it to a user's eye. A drawback associated with each of these systems is that they add substantial cost and complexity to the overall system design. For instance, time-varying diffusers require moving or vibrating parts that adversely affect the overall system size and complexity. Further, such systems tend to increase the power requirements of the overall system, thereby degrading efficiency.

There is thus a need for an improved speckle-reducing system for use with laser-based projection systems such as those employing semiconductor-type lasers.

BRIEF DESCRIPTION OF THE DRAWINGS

FIG. 3 illustrates a plan view of one birefringent wedge suitable for use with embodiments of the invention.

FIG. 4 illustrates a side, elevation view of one birefringent wedge suitable for use with embodiments of the invention.

FIG. 5 illustrates one embodiment of a birefringent wedge suitable for use with embodiments of the invention.

FIG. 11 illustrates one embodiment of a beam separator-glass wedge configuration in accordance with embodiments of the invention.

FIG. 12 illustrates one embodiment of a beam separator-glass wedge configuration in accordance with embodiments of the invention.

Figure 1:
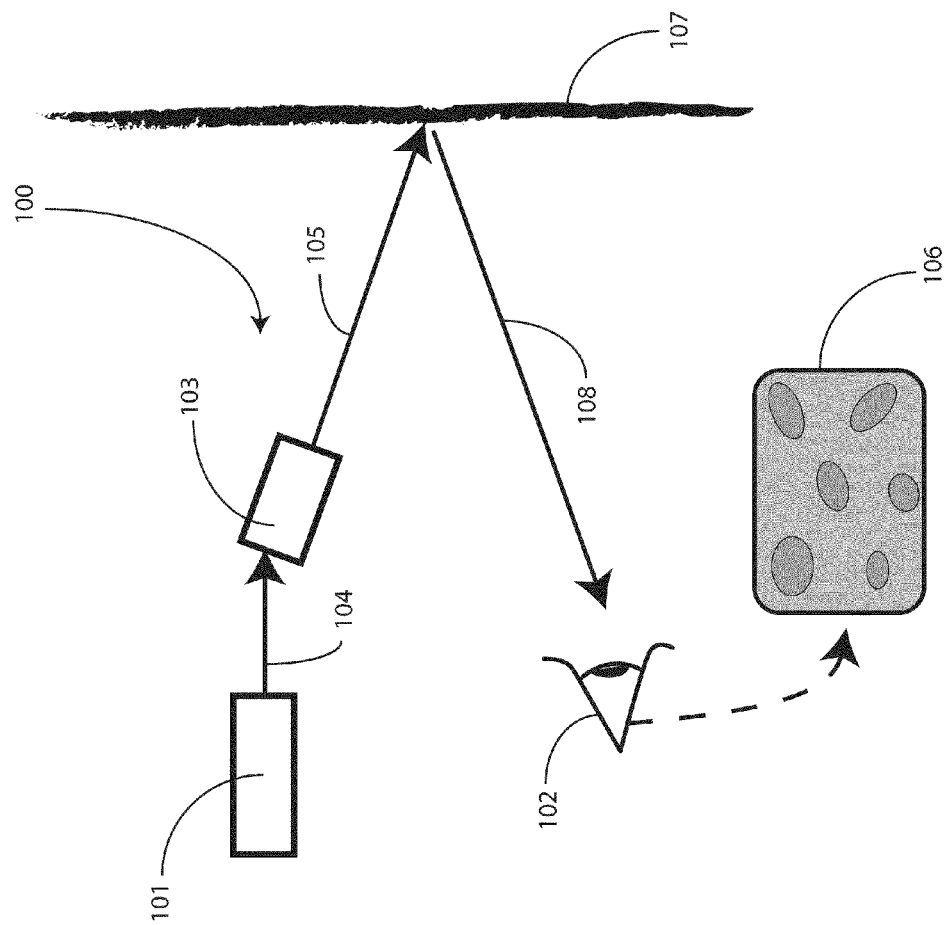
FIG. 1 illustrates a prior art laser-based projection system exhibiting speckle characteristics.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. The non-processor circuits may include, but are not limited to, microprocessors, scanning mirrors, image modulation devices, memory devices, clock circuits, power circuits, and so forth. As such, these functions may be interpreted as steps of a method to perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ a beam separator, which may be configured as birefringent wedge or a polymerized liquid crystal layer, within a laser projection system to separate one or more laser beams into two angularly separated components that are substantially orthogonally polarized, thereby reducing perceived speckle. Where the beam separator is configured as a birefringent wedge, the surfaces of the birefringent wedge may be either linear or non-linear. Where the outer shape or surfaces of the birefringent wedge are non-linear, a compensating, non-birefringent optical element will be used with the birefringent wedge to correct beam aberrations created by the birefringent wedge. This combination of a birefringent wedge and non-birefringent optical element will be referred to herein as a "compensated birefringent wedge." Note that even where the birefringent wedge is configured as a flat sided prism, a compensating, non-birefringent optical element can still be used. A flat-sided prismatic birefringent wedge can optionally be used without a compensating, non-birefringent optical element as well. In such a configuration, the separated beams will be deflected by some angle due to the physical configuration of the overall system. Where the beam separator is configured as a polymerized liquid crystal layer, a compensating element is not required as the molecules of the polymerized liquid crystal layer tilt while the input and output surfaces are always flat, planar, and substantially parallel.

As is known in the art, two orthogonally polarized laser beams from the same laser source do not generally interfere with each other, even when reflected from a non-uniform surface. The birefringent wedge and compensated birefringent wedge designs of the present invention, as well as the polymerized liquid crystal layer designs of embodiments of the present invention, offer a passive, readily manufacturable, simple solution to reducing speckle caused by a single laser source or multiple laser sources.

In one embodiment, the beam separator is configured as a "compensated beam separator" by including a compensating, non-birefringent wedge within the optic path after the beam separator to correct the separation or other abberrations introduced by the beam separator. Such will be the case when the beam separator is configured as a birefringent wedge that includes non-linear surfaces, and may be the case where the beam separator is configured as a birefringent wedge that includes linear surfaces. As noted above, the compensating element is not required when the beam separator is configured as a polymerized liquid crystal layer. Where used, this compensating element functions to avoid aberration in the resulting image. The compensating element can further provide redirection of the orthogonally-polarized beam pair emanating from the beam separator.

In some embodiments of the invention, a specially shaped birefringent "wedge" is used. As used herein, a "birefringent wedge" refers to a birefringent crystal cut with non-parallel major faces. Embodiments of the invention take into consideration the fact that the angular separation introduced by birefringent materials, while mitigating speckle, also impacts resolution. Where the angular separation is too great, image resolution can be adversely affected. As such, various embodiments of the invention described below utilize birefringent wedges having optimized design specifications, tolerances, and specification measurement ranges. Some of these ranges are examples, and are directed to a particular application. However, even the exemplary specifications described herein are not mere "design choices," but rather are chosen to achieve a substantial reduction in speckle without adversely impacting image resolution in a particular application.

For example, in one embodiment described below a birefringent wedge is designed to deliver an angular separation of between 1.5 and 2.0 arc minutes, such as approximately 1.8 arc minutes or 0.030 degrees. While the ranges can vary based upon the application, type of laser source employed, and overall physical dimensions of the laser projection source and projection surface, exemplary ranges suitable for mitigating speckle while preserving image resolution will be provided herein for compact laser projection sources, such as those employing Microelectromechanical System (MEMS) scanning mirrors as light modulation devices to form images. These exemplary ranges and specifications will guide the designer having the benefit of this disclosure in determining similar ranges for other applications.

In another embodiment of the invention, a polymerized liquid crystal layer has its rod-like mesogens oriented in a manner that varies monotonically across one dimension of a major face of the device such that an index of refraction across the layer as seen by light of a particular polarization changes accordingly. For example, a rotation function for each mesogen may vary linearly across a width of the device, thereby causing the index of refraction to vary non-linearly across the width of the device. This variance in the index of refraction introduces the angular separation, which operates to reduce speckle.

Embodiments of the present invention offer many advantages over prior art speckle reduction techniques. To begin, embodiments of the invention employing any of the birefringent wedge, compensated birefringent wedge, or the polymerized liquid crystal layer are readily manufacturable. To illustrate by using the birefringent wedge as an example, in one embodiment a birefringent wedge made of crystal quartz (SiO.sub.2) having major face dimensions of approximately three millimeters by three millimeters, with a thickness of approximately one millimeter, is used with a MEMS laser projection system. The wedge angle of such a design is approximately four degrees. Such a birefringent wedge delivers sufficient angular separation to reduce speckle by as much as twenty-five percent without deleteriously affecting resolution of the resulting image. Further, using these exemplary dimensions, the thickness can vary by one-tenth of a millimeter in any direction, while the wedge angle can vary by a tenth of a degree in either direction without adversely affecting performance. The major face can vary by two tenths of a millimeter in any direction. These tolerances are easily manufactured with readily available birefringent materials, and such a birefringent wedge is easily integrated into a compact laser projection source. Orientation with an incident beam within a three-degree tolerance, in one particular application, of the optic axis of the wedge results in over a twenty percent reduction in overall speckle.

Using the polymerized liquid crystal layer as another example, the layer can be manufactured by depositing a liquid crystal material having rod-like mesogens on a substrate. An electric field can then be applied to the liquid crystal material, with the potential of the electric field varying in accordance with a rotation function such that the orientation of each rod-like mesogen rotates increasingly more from one side of the substrate to the other. While this electric field is being applied, the liquid crystal material can be polymerized with ultraviolet light or heat or other methods, thereby fixing the orientations of each mesogen in the polymer. When this is done, the polymerized liquid crystal element functions similarly to the birefringent wedge described above, although no compensating element is required. Other manufacturing methods for the polymerized liquid crystal layer, such as using a rotating linear polarizer and slit-mask, will also be described below.

A second advantage of embodiments of the present invention is that birefringent wedges, compensated birefringent wedges, and polymerized liquid crystal layers configured in accordance with embodiments of the present invention do not adversely affect the large depth of focus offered by laser projection sources. By way of example, MEMS based laser projection systems, such as those manufactured by Microvision, Inc., have a depth of focus that is tens of meters long. By incorporating a birefringent wedge, a compensating birefringent wedge, or a polymerized liquid crystal layer beam separator in accordance with embodiments of the invention, this depth of focus is not substantially affected.

Another advantage offered by embodiments of the present invention is that the overall brightness of the laser projection system is not adversely affected by the inclusion of a birefringent wedge, compensated birefringent wedge, or polymerized liquid crystal layer with optical coatings disposed along major faces the respective device. For example, in one embodiment a single birefringent wedge is used with a compensating non-birefringent element to reduce speckle caused by a green laser source. In such an embodiment, overall brightness has been shown to be affected by no more than two percent when employing the compensated birefringent wedge. In another embodiment, two birefringent wedges are employed with compensating non-birefringent elements. One birefringent device is used to mitigate speckle caused by red laser light, and another is used to mitigate speckle caused by green laser light. In this embodiment, a polarization rotating device can optionally be used to further reduce speckle contrast ratio. In this embodiment, overall brightness of the laser projection system remains above ninety-five percent of its original brightness. The results when using polymerized liquid crystal layers without compensating elements are similar.

A third advantage is that the birefringent wedge, compensating birefringent wedge, or polymerized liquid crystal layer are each compact and simple, and none introduces additional moving parts. Further, none of the birefringent wedge, compensated birefringent wedge, or the polymerized liquid crystal layer requires energy to function. Either birefringent wedges used with a compensating non-birefringent element, non-compensated birefringent layers, or polymerized liquid crystal layers, when configured in accordance with embodiments of the present invention, can be mounted on printed circuit boards—either by way of adhesives or by mechanical carriers—and can be used with semiconductor type laser sources. Further, as the birefringent wedge, compensated birefringent wedge, or polymerized liquid crystal layer can be made in a small form factor, other components of the system do not need to be altered. For example, when using a birefringent wedge with a compensating non-birefringent element or polymerized liquid crystal layer in a MEMS-scanner-based laser projection system, the dimensions of the scanner mirror do not need to be changed as the angular separation is small enough as to not alter the overall size of the beam being delivered to the mirror.

One other advantage of embodiments of the present invention is that a laser projection source employing a birefringent wedge, a compensated birefringent wedge, or a polymerized liquid crystal layer as described herein can be used with other speckle mitigation techniques, such as, but not limited to, wavelength diversity or frame-to-frame averaging of uncorrelated speckle patterns techniques. For example, a laser projection system using a birefringent wedge with a compensating non-birefringent element or polymerized liquid crystal layer in accordance with embodiments of the present invention can be used with modules configured to alter successive frames of the images created by the light modulator, such as polarization switching modules, transverse phase modulation modules, static pseudo random couple phase modulation devices, or laser sources that are driven by high speed modulation devices.

Figure 2:
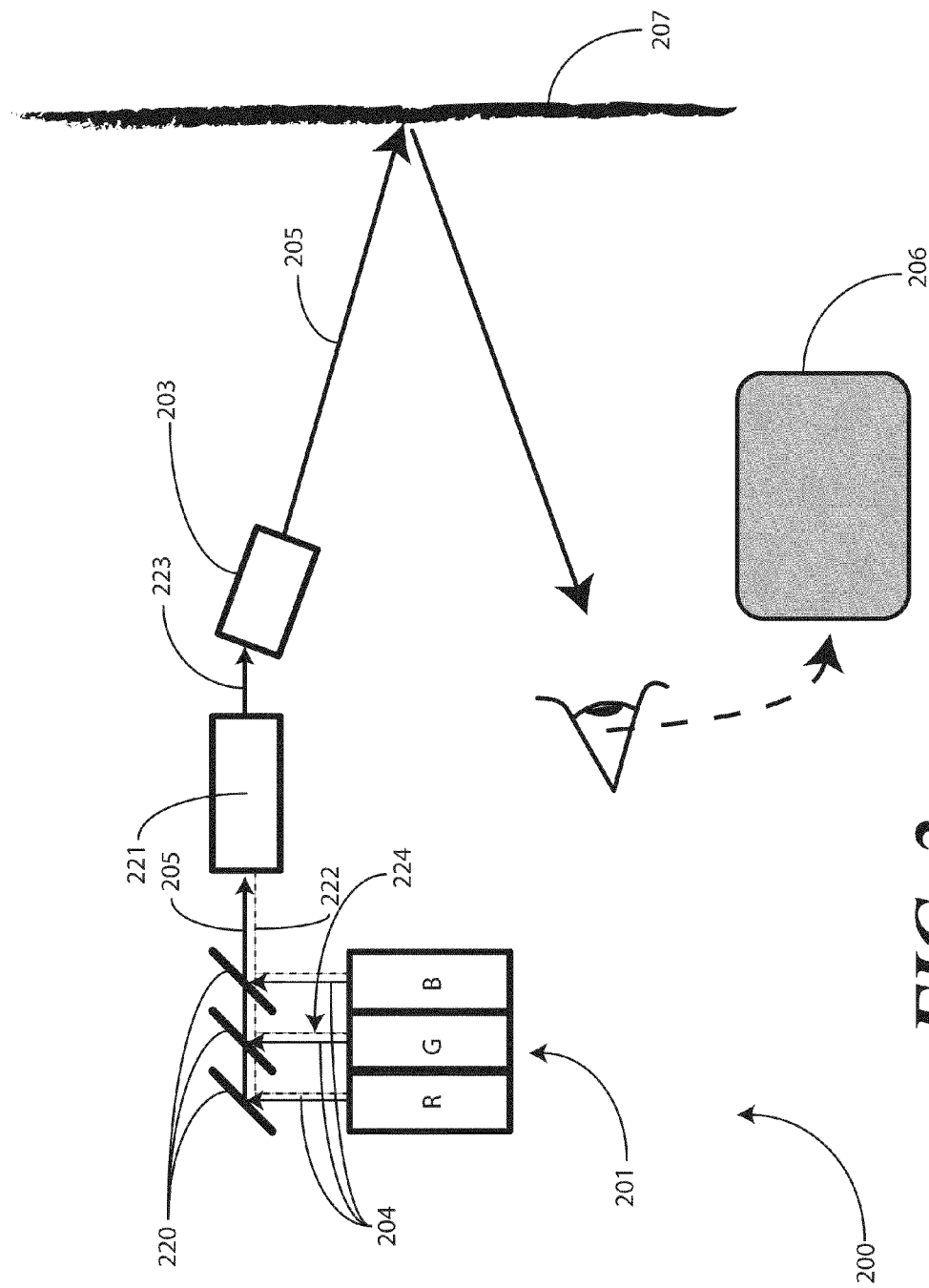
FIG. 2 illustrates one embodiment of a speckle reduction system in accordance with embodiments of the present invention.

Turning now to FIG. 2, illustrated therein is a general block diagram of a speckle-reducing laser imaging system 200 in accordance with embodiments of the invention. One or more laser sources 201 are configured to produce a plurality of light beams 204. In one embodiment, the one or more laser sources 201 comprise a red laser, a blue laser, and a green laser, as indicated by the "R," "G," and "B" in the illustrative embodiment of FIG. 2. These lasers can be various types of lasers. In one embodiment, each laser is a semiconductor laser that is small and efficient. For example, in one embodiment, the one or more laser sources 201 comprise edge-emitting lasers. In another embodiment, the one or more lasers sources 201 comprise vertical cavity surface emitting lasers. Such semiconductor lasers are well known in the art and are commonly available from a variety of manufacturers.

Figure 16:
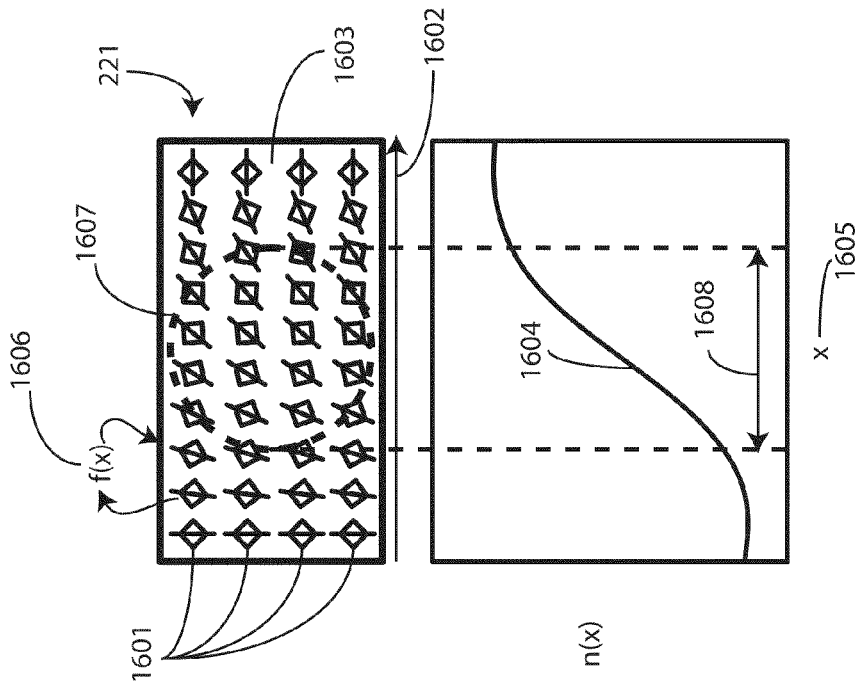
FIG. 16 illustrates a plan view of the polymerized liquid crystal layer of FIG. 15, along with a plot of the index of refraction.
Figure 15:
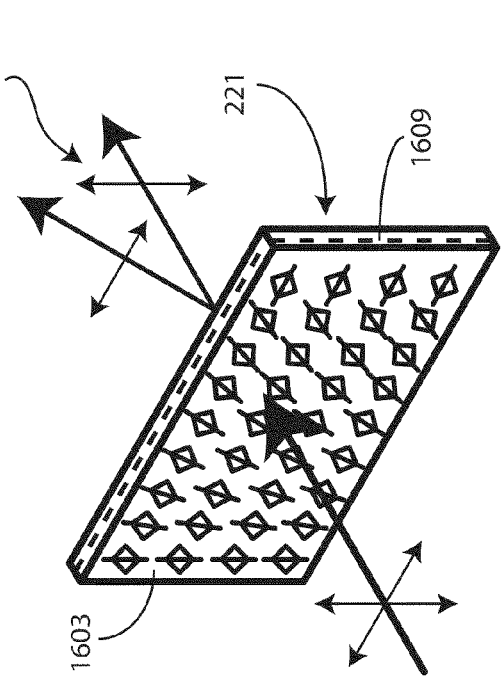
FIG. 15 illustrates one embodiment of a polymerized liquid crystal layer suitable for use as a beam separator in accordance with embodiments of the invention.

To facilitate freedom of design, i.e., to permit the designer to orient the one or more laser sources 201 in different ways relative to the light modulator 203, one or more optical alignment devices 220 can be used to direct light beams 204 from the one or more laser sources 201. The one or more optical alignment devices 220, in one embodiment, are used to orient the plurality of light beams 204 into a single light beam 205. Where the one or more laser sources 201 comprise a red laser, blue laser, and green laser, the one or more optical alignment devices 220 can blend the output of each laser to form a coherent beam of white light. In accordance with one embodiment of the invention, this combined light beam 205 is circularly polarized. In accordance with another embodiment of the invention, the combined light beam 205 is linearly polarized at an angle of about forty-five degrees relative to an orientation of the optical axis of the beam separator 221. In the illustrative embodiment of FIG. 2, the beam separator 221 can be any of a birefringent wedge, a compensated birefringent wedge, or a polymerized liquid crystal layer. As will be described below, in one embodiment the beam separator 221 is a compensated birefringent wedge as shown in FIGS. 11 and 12, as the birefringent wedge is used in conjunction with a compensating, non-birefringent element. In another embodiment, the beam separator 221 is configured as a birefringent wedge having flat sides as shown in FIG. 5 below, thereby not necessary needing a compensating element. In yet another embodiment, the beam separator 221 is configured as a polymerized liquid crystal layer as shown in FIGS. 15 and 16, which does not need a compensating element. In some embodiments, the angle of polarization relative to the orientation of the optical axis of the beam separator 221 can be used for optimum energy repartition between the two beams, i.e., to balance the relative intensity of each beam. The term "about" is used to indicate that the forty-five degree polarization can be slightly more or less due to manufacturing tolerances.

In one embodiment, dichroic mirrors are used as the one or more optical alignment devices 220. The dichroic mirrors are used to orient the plurality of light beams 204 into the combined light beam 205. Dichroic mirrors are partially reflective mirrors that include dichroic filters that selectively pass light in a narrow wavelength bandwidth while reflecting others. In one embodiment, polarizing coatings can be incorporated into the dichroic mirrors where the combined light beam 205 is linear polarized. Dichroic mirrors and their use in laser-based projection systems are known in the art and, as such, will not be discussed in further detail here.

Note that the location, as well as the number, of the optical alignment devices 220 can vary based upon application. For example, in some MEMS-type scanning systems, the plurality of light beams 204 can be modulated directly into the scanning mirror. This "light modulator" can then feed into an optical alignment device. Alternatively, some applications may not require optical alignment devices 220.

A light modulator 203 is then configured to produce images 206 by modulating the combined light beam and delivering it to a display surface 207. In one embodiment, the light modulator 203 comprises a MEMS scanning mirror. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference.

Embodiments of the invention are well suited for use with MEMS scanning mirrors as the birefringent wedges, compensated birefringent wedges, and polymerized liquid crystal layers used with embodiments of the invention can be manufactured with a compact form factor. As a result, the overall system can be designed with a very small form factor, suitable for use in portable electronics such as mobile telephones, personal digital assistants, gaming devices, music players, multimedia devices, wearable optics with head-up displays, and so forth.

To reduce perceived speckle, in one embodiment a beam separator 221 is disposed between the one or more light sources 201 and the light modulator 203. In the illustrative embodiment of FIG. 2, the beam separator 221 is disposed between the one or more optical alignment devices 220 and the light modulator 203. Where the beam separator 221 is a compensated birefringent wedge comprising a birefringent wedge used in conjunction with a compensating non-birefringent element, both the birefringent wedge and compensating non-birefringent element can be disposed between the one or more optical alignment devices 220 and the light modulator 203. It will be clear to those of ordinary skill in the art having the benefit of this disclosure, however, that the invention is not so limited. For example, a birefringent wedge and optional compensating non-birefringent element, or a polymerized liquid crystal layer, could be disposed between each laser source 201 and its respective optical alignment device 220. For instance, a birefringent wedge or compensated birefringent wedge used to mitigate speckle caused by the green laser source, may be placed at location 224. Similarly, a polymerized liquid crystal layer could be used to mitigate speckle caused by the green laser source at location 224 as well.

It is known to those in the art that birefringent materials—be they crystalline or polymerized liquid crystal—operate on different frequencies in different ways. For example, angular separation introduced into a green laser beam will be different from the angular separation introduced into a blue laser beam. Accordingly, embodiments of the present invention can be optimized or tuned to mitigate speckle caused by certain wavelengths of light. For example, experimental testing has shown that green light, with a wavelength of about 532 nanometers, is responsible for a large percentage of perceived speckle in a laser system employing red, green, and blue lasers. The red laser contributes the next largest percentage of speckle, followed by blue. Blue light is less perceptible by the human eye, so the speckle caused by blue light is relatively small.

In the illustrative embodiment of FIG. 2, the beam separator 221 is disposed such that the combined light beam 205 intersects the beam separator 221. However, as green light contributes substantially to speckle, the beam separator 221 of FIG. 2 is optimized for speckle reduction for the green wavelength. Optimization can be achieved by material selection, or wedge shape in the case of a birefringent wedge or compensated birefringent wedge, or by rotational orientation of the mesogens in the case of polymerized liquid crystal layer. As such, in one embodiment the beam separator 221 is tuned such that the desired angular separation of about 1.8 arc minutes occurs at the green wavelength. With such a design, the beam separator 221 can be disposed as shown in FIG. 2, i.e., between the one or more optical alignment devices 220 and the light modulator 203 along an optical axis 222 of the system 200. Alternatively, it could be disposed at location 224, which is between the green laser source and its respective optical alignment device. Such an embodiment is shown in FIG. 14.

Figure 14:
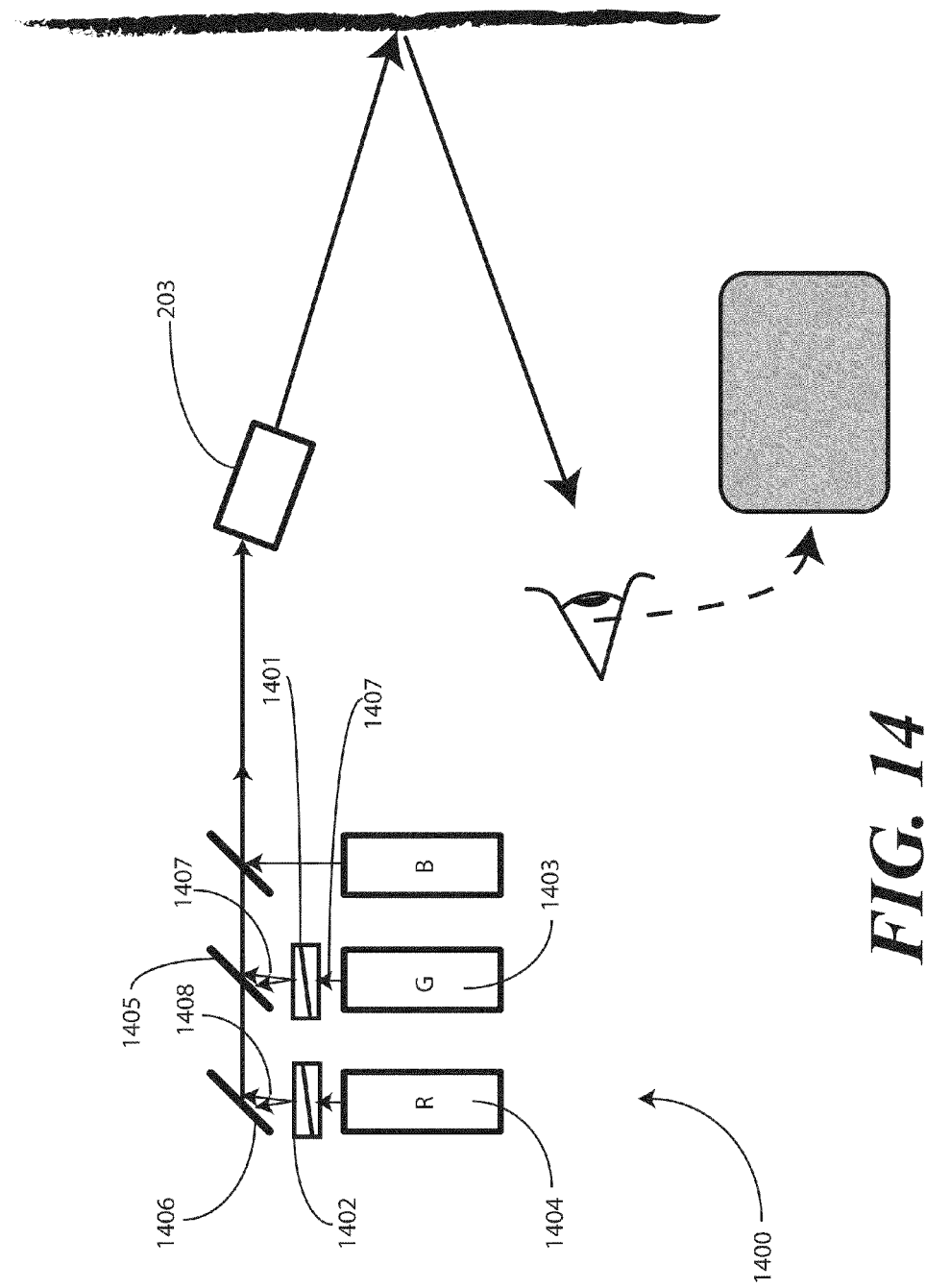
FIG. 14 illustrates another embodiment of a speckle reduction system in accordance with embodiments of the present invention.

Turning briefly to FIG. 14, illustrated therein is an imaging system 1400 employing multiple beam separators 1401,1402. Note that both beam separators 1401,1402 may be birefringent wedges or compensated birefringent wedges. Alternatively, both beam separators 1401,1402 can be polymerized liquid crystal layers. Of course, combinations of these can be used as well. Beam separator 1401 may be a birefringent wedge, while beam separator 1402 may be a polymerized liquid crystal layer or compensated birefringent wedge, or vice versa.

As with the system (200) of FIG. 2, optical alignment devices 1405, 1406 are used to orient light from the laser sources 1403,1404 to the light modulator 203. Specifically, a first optical alignment device 1405 is disposed between the green laser source 1403 and the light modulator 203 along an optical axis 1407. A second optical alignment device 1406 is disposed between the red laser source 1404 and the light modulator 203 along a second optical axis 1408.

In this illustrative embodiment, one beam separator 1401 is being used to create angular separation for the green laser source 1403, while a second beam separator 1402 is being used to create angular separation for the red laser source 1404. In this embodiment, the beam separator 1401 is disposed between the green laser source 1403 and its corresponding optical alignment device 1405, and the second beam separator 1402 is disposed between the red laser source 1404 and the second optical alignment device 1406. In this configuration, the first beam separator 1401 can be tuned to optimize the angular separation of the green wavelength, while the second beam separator 1402 can be optimized for the desired angular separation of the red wavelength. A third beam separator 1402 can be used with the blue laser source.

Turning now back to FIG. 2, regardless of its placement, the beam separator 221 is configured, in one embodiment, to receive the combined light beam 205 and deliver two angularly separated light beams 223 to the light modulator 203 so as to reduce perceived speckle appearing when images 206 are displayed on a display surface 207. Further, as a birefringent device, whether crystalline or polymerized liquid crystal, is being used to introduce the separation, the resulting angularly separated light beams 223 will be substantially orthogonally polarized as well.

Note that in an alternative embodiment, the beam separator 221 can be placed after the light modulator 203. Said differently, the beam separator 221 can be disposed between the light modulator 203 and the display surface 207 so as to reduce perceived speckle. Where a MEMS-based scanning system is used as the light modulator 203, the birefringent wedge, compensated birefringent wedge, or polymerized liquid crystal layer will generally be placed between the laser sources and the light modulator 203. However, when other projection sources are employed, such as a digital light projection system or liquid crystal on silicon system, the birefringent wedge, compensated birefringent wedge, or polymerized liquid crystal layer might be disposed between the light modulator 203 and the display surface 207.

While the dimensions and specifications of the beam separator 221 are somewhat changeable based upon application, for illustrative purposes, one embodiment of a birefringent wedge, compensated birefringent wedge, or polymerized liquid crystal layer suitable for use with MEMS scanning laser light projection systems will be described herein. It will be clear to those of ordinary skill in the art having the benefit of this disclosure that the invention is not so limited, however. For example, while the specifications and tolerances described herein are suitable for use with some embodiments of MEMS-based laser projection systems, the description herein will guide those of ordinary skill in the art having the benefit of this disclosure to obtain birefringent wedges, compensated birefringent wedges, or polymerized liquid crystal layers having different dimensions, birefringence, and tolerances as determined by a particular application or requirements.

In the illustrative embodiment that will be described herein, the beam separator 221 is designed and tuned to introduce an angular separation of between 1.5 and 2.0 arc minutes for the green wavelength of light. In one exemplary embodiment, the beam separator 221 is designed such that the angular separation for the green wavelength is about 1.8 arc minutes, or 0.030 degrees. Consequently, the two angularly separated light beams 223, where those angularly separated light beams 223 comprise light of the green wavelength, will be separated by an angle of about 1.8 arc minutes. This angle, in the configuration of FIG. 2, has been shown to reduce speckle by twenty percent without significantly affecting depth of focus or image resolution.

This particular angular separation is useful in laser projection systems, such as MEMS scanned laser projection systems, for several reasons. First, it conserves the very long depth of focus associated with these systems in that the angle is small enough that no additional optically transformative components need to be added to the system to compensate for this angular separation. Said differently, when introducing a small angular separation such as less than two arc minutes, from the perspective of the image projection system it merely creates images with a slightly wider beam. No projection-type optic components are required for the system to operate normally.

Another advantage to this amount of angular separation is that it enables a laser projection system to be designed with a very compact form factor. For example, in a MEMS scanned laser projection system, the birefringent wedge, compensated birefringent wedge, or polymerized liquid crystal layer does not significantly alter the beam width on the scanning mirror. As such, there is no need to increase the size or geometry of the constituent parts of the image projection system.

Another advantage to this amount of angular separation is that it helps to mitigate raster modulation where the separation occurs along the slow scanning axis of the raster scanning system. This is due to the fact that the angular separation creates a slightly larger beam along the slow scanning axis of the raster system, thereby mitigating raster modulation.

One other advantage to this amount of angular separation is that it minimally impacts brightness of the overall system. For example, where one beam separator 221 delivering an angular separation of between 1.5 and 2.0 arc minutes is used, as shown in FIG. 2, the reduction in overall brightness of images projected on a surface will be less than a two percent reduction.

Turning now to FIGS. 3-5, illustrated therein is one embodiment of a beam separator 221 configured as a birefringent wedge and suitable for use with laser projection sources. In one embodiment, the beam separator 221 is a birefringent wedge made of crystal quartz and includes a first major face 301 and a second major face 401. The second major face 401 is disposed opposite the beam separator 221 relative to the first major face 301. FIG. 3 illustrates a plan view of the beam separator 221, showing a major face 301, while FIG. 4 illustrates a side, elevation view of the beam separator 221, where the first major face 301, second major face 401, and thickness 402 can be seen. FIG. 5 illustrates angularly separated beams 501 exiting the beam separator 221. The illustrative beam separator 221 shown in FIGS. 3-5 is suitable, as noted above, for use in MEMS scanned laser projection sources.

As the beam separator 221 is indeed birefringent crystal configured as a wedge, the first major face 301 and second major face 401 are non-parallel with respect to each other. As viewed in FIG. 4, the top 403 of the beam separator 221 is thicker than the bottom 404 of the beam separator 221. As such, the first major face 301 and second major face 401 are configured at a wedge angle 405. In one embodiment, the wedge angle 405 is between 3.6 degrees and 4.4 degrees. For example, in manufacture, the birefringent wedge can be designed such that the wedge angle 405 is 4.0 degrees, plus or minus 0.4 degrees. This wedge angle 405, in conjunction with the specified birefringent material optical axis angle 417, is well suited to deliver the 1.8 arc minute angle for a MEMS scanned laser source mentioned above.

When selecting the wedge angle 405, it is well to note that a larger wedge angle 405 increases the acceptable tolerance in manufacture for the wedge angle 405. Said differently, the larger the wedge angle 405 is, the looser the tolerance specifications for that wedge angle 405 can be. However, a larger wedge angle increases sensitivity of angular separation to physical alignment of the birefringent wedge within the system. In other words, a larger wedge angle 405 increases the sensitivity of alignment of the optical axis 406 with respect to the wave vector impinging upon the birefringent wedge. For this reason, in one embodiment, the wedge angle 405 is kept small, such as on the order of three to five degrees, to make the image projection system more easily manufactured.

The next design consideration is the angle of the optical axis 406 relative to the light 407 incident upon the beam separator 221. In one embodiment, the beam separator 221 is manufactured so that for a transmission angle normal to the surface of first major face 301, the angle between the birefringence optical axis 406 and the ray will be comprised between 61.5 degrees and 67.5 degrees. This exemplary optical axis angle 417 is suited to deliver the 1.8 arc minutes angle for a MEMS scanned laser source, where the wedge angle 405 is about 4 degrees, in the above mentioned configuration. To maintain a ten percent tolerance on angular separation, the angle between the birefringence optical axis 406 and the ray will be 64.5 degrees, plus or minus three degrees. Thus, a six-degree tolerance is permitted during manufacture within which to reduce speckle without substantially affecting resolution.

In yet another embodiment of the invention, it is possible to modify the angular separation of the two beams by "clocking" the birefringent wedge clockwise or counterclockwise with respect to the input beam. Rotating the wedge by about twenty degrees, both clockwise and counterclockwise, results in an angular separation ranging from 1.3 arc minutes to 2.5 arc minutes, which is within the design parameters described previously.

Another design consideration is the polarization of incident light 407. As noted above, in one embodiment, the incident light 407, which is generated by a laser source in a laser projection system, is circularly polarized light 302. As is known in the art, circularly polarized light 302 is split into two orthogonally polarized, angularly separated components by a beam separator 221. In one embodiment, to optimize speckle reduction, one should ensure that each of the two angularly spaced components have the same intensity. This can occur when the incident light 407 is circularly polarized light 302.

This can also occur when the incident light 407 is linearly polarized light 303, provided it is properly polarized. As is known in the art, when incident light 407 having an arbitrary polarization enters a birefringent material, it splits into two component beams. A birefringent material is characterized by its indicatrix which is an ellipsoid. One component beam is polarized along the long axis of the elliptical cross section of the indicatrix with a plane normal to the wave vector. The other component beam is polarized along the short axis of the elliptical cross section of the indicatrix with a plane normal to the wave vector. In a uniaxial birefringent material the indicatrix is a spheroid with the optical axis being the axis of rotation. In this case either the minor or major axis of the elliptical cross section has the same length for all directions of the wave vector. The component polarized along this direction is called the ordinary wave. The component polarized along the other axis is called the extraordinary wave. These components travel independently in separate directions and at different velocities.

When incident light 407 is polarized, it moves in accordance with the indices of refraction of the birefringent material and in accordance with its polarization. For example, waves polarized in the equatorial plane of the indicatrix move at a velocity related to a first index of refraction, and which is expressed as c/n.sub.o. This ordinary index of refraction is a function of optical axis 406 orientation 304. Waves polarized perpendicularly to the ordinary polarization move at a velocity related to a second index of refraction, which is expressed as c/n.sub.e. This is the extraordinary index of refraction Where the incident light 407 is polarized, optimum energy repartition occurs when the polarization is about 45 degrees relative to the orientation 304 of the optical axis 406. As such, in one embodiment, the incident light 407 is linearly polarized light. Specifically, the incident light 407 includes linearly polarized light 303 that is polarized at an angle of about 45 degrees relative to the orientation 304 of the birefringent wedge optical axis 406 along the first major face 301 of the birefringent wedge.

The dimensions of the major faces 301,401 can vary. In one embodiment, suitable for use with MEMS scanning laser sources, the first major face 301 and second major face 401 each measure between 2.0 and 5.0 millimeters in length and width. For example, in one embodiment the birefringent wedge is effectively square along its first major face 301, as the length and width measure 3.0 millimeters, with a tolerance of plus or minus 0.2 millimeters.

Regarding thickness, in one embodiment, the thickness 402 of the birefringent wedge is between 0.75 millimeters and 1.25 millimeters. For example, in one embodiment suitable for use with a MEMS scanning laser projector, the thickness 402 of the birefringent wedge is 1.0 millimeters with a manufacturing tolerance of plus or minus 0.1 millimeters.

In one embodiment, to aid in manufacture, an alignment notch 305 can be included in the birefringent wedge. The alignment notch 305 assists a technician assembling a laser projection system in accordance with embodiments of the invention to identify the orientation 304 of the optical axis 406 of the birefringent wedge without the use of optical instruments or test fixtures. The inclusion of the alignment notch 305 is optional, but may save time during manufacture and testing.

In one embodiment, the beam separator 221 is a birefringent wedge manufactured from crystalline quartz (SiO.sub.2). Crystalline quartz is well suited to embodiments of the invention in that it is relatively inexpensive, has indices of refraction that can be tailored to the green wavelength, and is readily manufacturable within the tolerances set forth in the illustrative embodiments above. Additionally, the birefringent magnitude, which is the difference of n.sub.o from n.sub.e, is easily configured to deliver an angle of separation that reduces speckle without significantly affecting overall resolution. Specifically, in one embodiment the crystalline quartz is a uniaxial, anisotropic crystal for which the refractive index will be dependent upon the input beam polarization, and the angular separation will be directly proportional to the birefringent magnitude and the wedge angle 405.

While crystalline quartz is one material suitable for manufacture of the birefringent wedge, it will be clear to those of ordinary skill in the art having the benefit of this disclosure that the invention is not so limited. For example, as shown in FIGS. 15-18, in one embodiment polymerized liquid crystal can be used to manufacture the beam separator 221. When using polymerized liquid crystal, a particular orientation 304 of the optical axis 406 can be configured electronically in the polymerized liquid crystal. This orientation 304 can then be "set" in place, for example by projecting ultraviolet light on the polymerized liquid crystal. In so doing, the polymerized liquid crystal can be designed specifically for a particular application or design.

Figure 21:
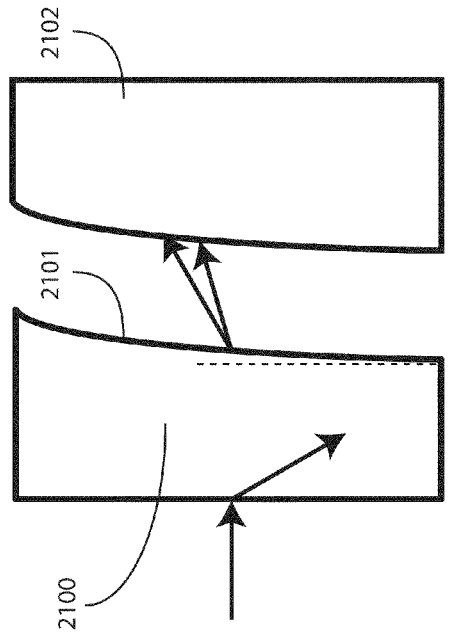
FIG. 21 illustrates one embodiment of a birefringent wedge that includes a major face having a curvilinear surface in accordance with embodiments of the invention.

While the embodiment of FIGS. 3-5 illustrates a birefringent wedge having a linearly changing index of refraction, there will be some applications in which a non-linearly changing index of refraction is desirable. Turning briefly to FIG. 21, illustrated therein is one embodiment of a birefringent wedge 2100 having a non-linearly changing index of refraction. Specifically, one major face 2101 includes a curvilinear surface. While the curvilinear surface of FIG. 21 is concave, it will be clear to those of ordinary skill in the art having the benefit of this disclosure that the invention is not so limited. The curvilinear surface of the major face 2101 could be convex as well, or a more complex shape as determined by the application. Where the birefringent wedge 2100 includes a curvilinear surface, a compensating, non-birefringent optical device 2102 will be used to correct aberration introduced by the birefringent wedge 2100. The use of compensation, non-birefringent optical devices will be described in more detail with respect to FIGS. 11 and 12 below.

Turning now to FIGS. 15 and 16, illustrated therein is an alternate embodiment of a beam separator 221. The embodiments of FIGS. 15 and 16 are that of a beam separator 221 where the beam separator 221 is configured not as a birefringent wedge, but instead as a polymerized liquid crystal layer. The polymerized liquid crystal layer includes a plurality of mesogens 1601 that each function as an oriented optical element. Each mesogen 1601 is oriented in accordance with a rotational function 1606 that varies monotonically along a dimension 1602 across a major face 1603 of the polymerized liquid crystal layer. This monotonic variation of the function 1606 results in an index of refraction 1604 that changes monotonically across the dimension 1602 as well. Said differently, by varying the function 1606 across the major face 16, each mesogen 1601 rotates by an additional amount that is dependent upon the distance across the major face 1603. The result is a birefringent device capable of separating a light beam into two angularly separated light beams due to the varied index of refraction.

The function 1606 expresses the amount of rotation, or the different degrees of orientation of each of the mesogens 1601. The change in index of refraction 1604 of the polymerized liquid crystal layer is determined by the function 1606. The birefringence of the polymerized liquid crystal layer can therefore be designed with an appropriate rotational orientation of the mesogens 1601 across the major face 1603 as to provide a desired amount of angular separation between light beams exiting the layer. A designer may vary the change in birefringence of the polymerized liquid crystal layer simply by varying the function 1606 along the major face 1603.

In the illustrative embodiment of FIG. 16, the function 1606 is a linear, monotonically increasing function. Moving from left to right along the dimension 1602, each rod-like mesogen rotates by a proportional amount. From end to end, along the major face 1603, the mesogens 1601 in this illustrative embodiment rotate a total of 90 degrees.

This linear, monotonically increasing function results in an index of refraction 1604 that changes in a non-linear and monotonically increasing manner. In the illustrative embodiment of FIG. 16, the resulting index of refraction 1604 shown is similar in appearance to a portion of a sine wave. A linear, monotonically increasing orientation function for the mesogens 1601 is useful because it is relatively easy and inexpensive to manufacture. It will be clear to those of ordinary skill in the art having the benefit of this disclosure, however, that the invention is not so limited. A linear, monotonically increasing function is but one example of a suitable function 1606 for embodiments of the invention. Other examples include a linear, monotonically decreasing function, a non-linear, monotonically increasing function, and a non-linear, monotonically decreasing function. Where, for example, a non-linear function is used, a designer may configure the function such that the resulting index of refraction is linear.

When a designer takes advantage of the cost-savings and ease of manufacture provided by using a linear, monotonically increasing function, as noted above, the resulting index of refraction 1604 for the polymerized liquid crystal layer will be non-linear. However, a linear index of refraction may still be desirable in a given application. Where this is the case, a designer may want to create a polymerized liquid crystal layer that is large enough that light from the laser source projects through only a portion of the major face 1603. More specifically a designer may wish to configure the polymerized liquid crystal layer such that light passes only through a projection region 1607 in which a range 1608 of the change in index of refraction 1604 approximates a linear function. As shown in FIG. 16, while the index of refraction 1604, n(x), appears as a partial sine wave across a width of the major face 1603, along range 1608 the index of refraction approximates a linear function in that the slope of a tangent line varies less within range 1608 than it does outside range 1608. For instance, a line tangent to the index of refraction 1604 to the right or left of range 1608 will tend to be closer to parallel than will a tangent line drawn within range 1608. Said differently, a line tangent to the index of refraction 1604 along range 1608 will be more vertical than will a line tangent to the index of refraction 1604 outside range 1608.

Figure 19:
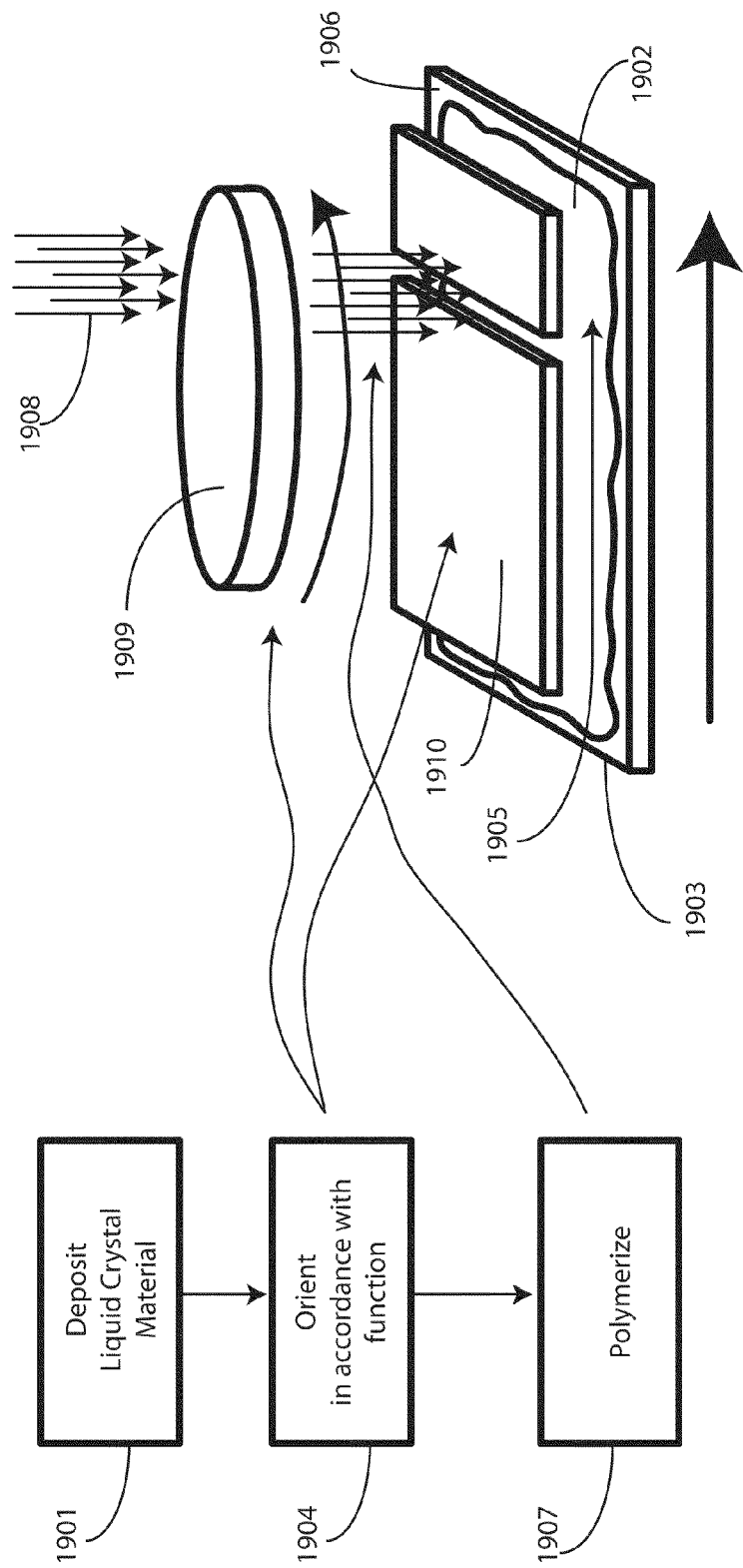
FIGS. 19 and 20 illustrate exemplary methods of manufacturing polymerized liquid crystal layers in accordance with embodiments of the invention.

Turning now briefly to FIG. 19, illustrated therein is one illustrative method of making the polymerized liquid crystal layer shown in FIGS. 15 and 16. The embodiment of FIG. 19 is illustrative only, as it will be clear to those of ordinary skill in the art having the benefit of this disclosure that the invention is not so limited.

At step 1901, liquid crystal material 1902 comprising a plurality of rod-like mesogens is deposited on a substrate 1903. At step 1904, each of the plurality of mesogens is oriented in accordance with a function that varies monotonically along a dimension 1905 of a major face 1906 of the substrate 1903 such that an index of refraction associated with the liquid crystal material 1902 varies monotonically along the dimension 1905. At step 1907, the liquid crystal material 1902 is polymerized. In the illustrative embodiment of FIG. 19, the liquid crystal material 1902 is polymerized by the application of ultraviolet light 1908 so as to fix the rotational orientations of each mesogen in accordance with the function.

In one embodiment, the steps 1904,1907 of orienting and polymerizing can be carried out with the assistance of a rotating linear polarizer 1909 and a slit-mask 1910. Upon providing the rotating linear polarizer 1909 and the slit-mask 1910, the mesogens can be configured in the proscribed orientation by projecting the ultraviolet light 1908 through the rotating linear polarizer 1909 and through the slit in the slit-mask while the substrate 1903 is passed laterally beneath the slit mask 1910. By varying the speed at which the rotating linear polarizer 1909 turns and the speed at which the substrate 1903 passes beneath the slit-mask 1910, the mesogens can be configured in the proscribed orientation.

Now that the process is understood, an illustrative design will be discussed to illustrate some of the considerations when designing a polymerized liquid crystal layer for a particular application. As noted above, in one exemplary application, the beam deviation desired is about 0.015 degrees for each beam, yielding an angular separation of 0.030 degrees. While this occurs, the optical path difference for each beam should be one wavelength. For an illustrative light beam that passes through the polymerized liquid crystal layer having a wavelength of 540 nanometers, the transverse distance over which the index varies such that there is a one-wavelength path-length difference for rays traversing the material is 2.063 millimeters, which is determined by dividing the wavelength by the sine of the angle of desired beam deviation.

Assuming a material birefringence of 0.15 for a typical liquid crystal material 1902 as manufactured in FIG. 19, and presuming that the change in index of refraction is to be approximately linear in the projection region (1607), and estimating that acceptable linearity can be expected in the range of index from $n(0.1) = n.sub.o + 0.1*0.15;$ to $n(0.9) = n.sub.o + 0.9*0.15,$ where n.sub.o is the ordinary index of refraction of the liquid crystal material 1902.

As such, the proper thickness of the liquid crystal can correspondingly be determined. Specifically, the thickness, d, is the wavelength divided by the length of the range, 0.8, times the change in material birefringence, which yields a thickness of liquid crystal material 1902 of 4.5 micrometers.

When constructed for a laser scanned projection source, such as a MEMS-based scanning system, such a polymerized liquid crystal layer can be constructed by depositing liquid crystal material between two glass substrates, each having major faces measuring, for example, about three millimeters by three millimeters. A projection region can be defined as a clear aperture there having dimensions of approximately two millimeters by two millimeters. The surface quality of the projection region may be configured to be 40/20 or better. Where incident light is polarized horizontally, the thickness of the polymerized liquid crystal layer can be set such that the optical path deviation through the liquid crystal material of one wavelength is introduced through a transverse width of 2.06 millimeters in the liquid crystal material. This results in a deviation of plus or minus 0.015 degrees from the optical axis for light polarized at plus or minus 45 degrees by the refractive index profile within the projection region. This design is illustrative only, and the claims are not intended to be limited by this design example.

Figure 18:
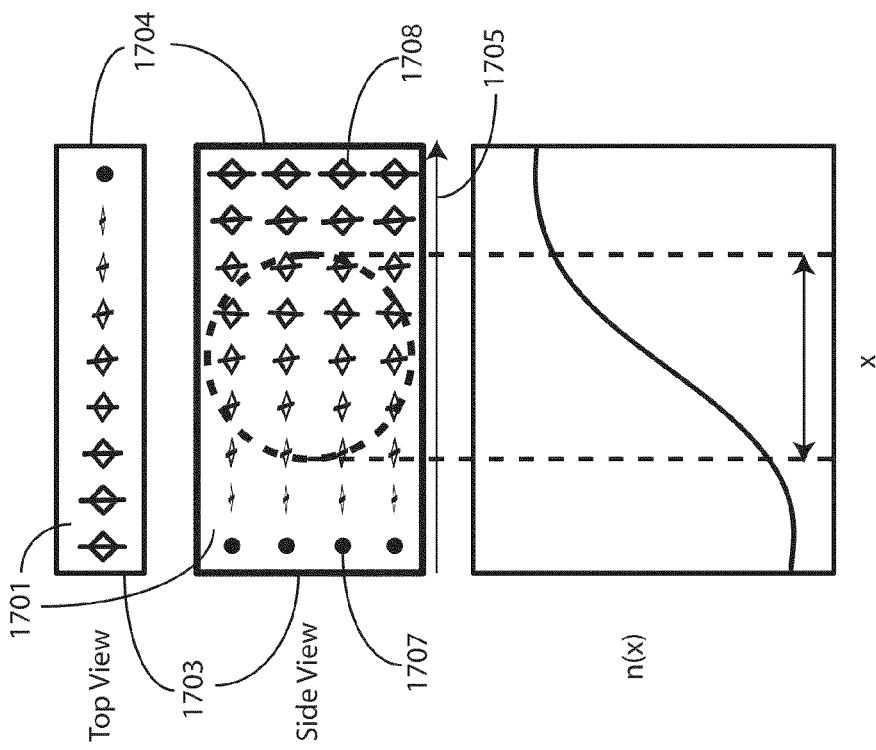
FIG. 18 illustrates a plan view of the polymerized liquid crystal layer of FIG. 17, along with a plot of the index of refraction.
Figure 17:
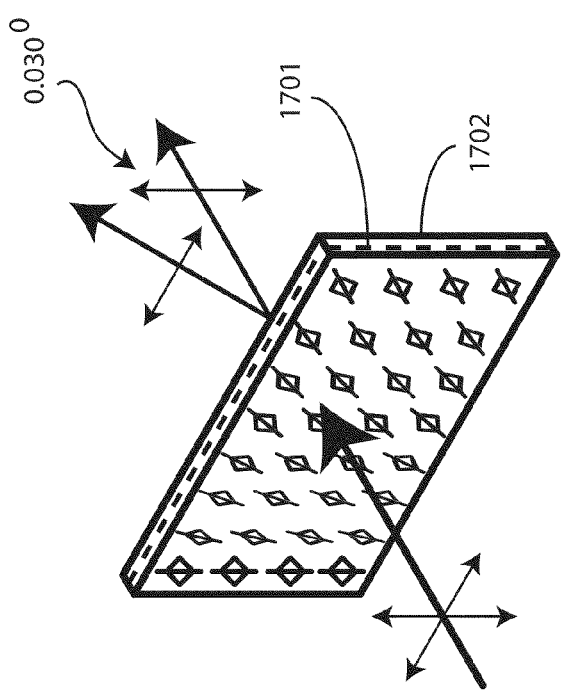
FIG. 17 illustrates one embodiment of a polymerized liquid crystal layer suitable for use as a beam separator in accordance with embodiments of the invention.

In the illustrative embodiment of FIGS. 15 and 16, each of the rod-like mesogens 1601 is oriented substantially parallel with the substrate 1609 upon which they are disposed. Turning now to FIGS. 17 and 18, another illustrative embodiment of a polymerized liquid crystal layer 1701 suitable for use as a beam separator is shown. In FIGS. 17 and 18, the mesogens are oriented such that they are substantially orthogonal to the substrate 1702 on one side 1703 of the substrate 1702, and are oriented substantially parallel with the substrate 1702 on the other side 1704.

The rotational orientation of each mesogen in FIGS. 17 and 18, as with FIGS. 15 and 16, is governed by an orientation function. In the illustrative embodiment of FIGS. 17 and 18, the function is such that the mesogens are oriented at increasingly acute angles relative to the substrate 1702 moving from left to right along the dimension 1705. As such, mesogens 1707 at the first side 1703 are generally orthogonal with the major face of substrate 1702, while mesogens 1708 on the second side 1704 are generally parallel with the major face of the substrate 1702.

Figure 20:
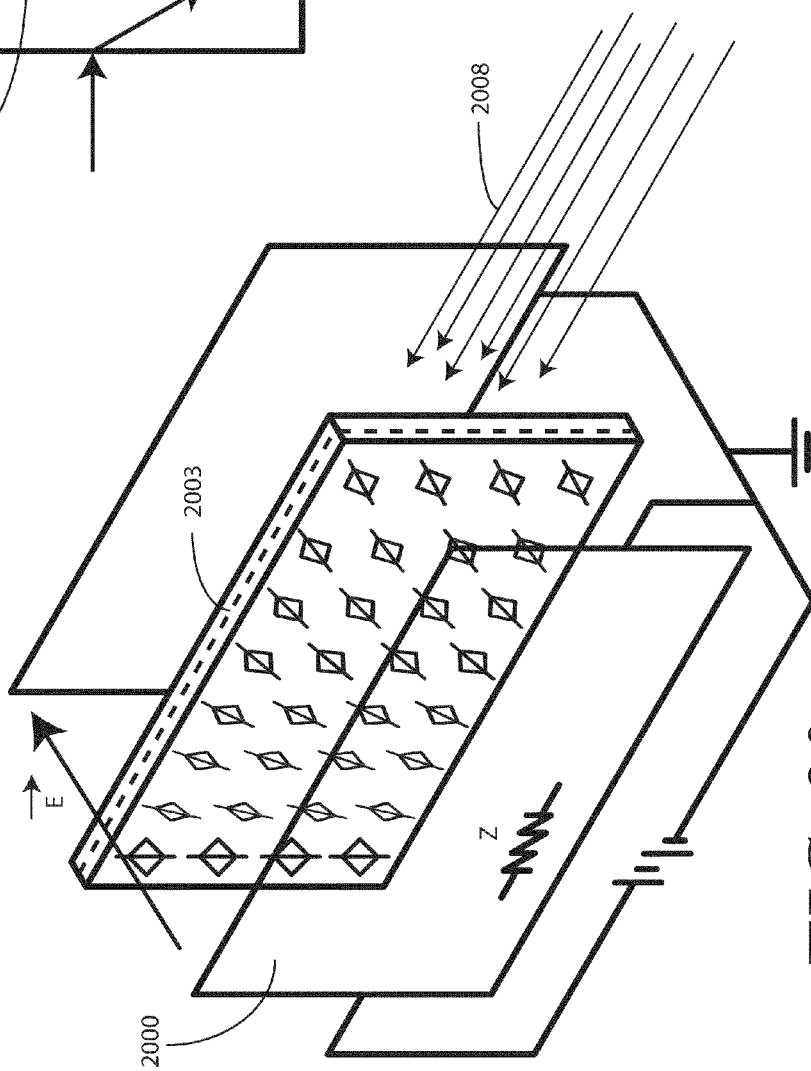

Turning now to FIG. 20, illustrated therein is one exemplary method of manufacturing the polymerized liquid crystal layer of FIGS. 17 and 18. The general method is the same as that shown in steps 1901, 1904, and 1907 of FIG. 19. However, in FIG. 20, the step (1904) of orienting includes the application of an electric field to the liquid crystal material 2003 by way of a plate 2000 having a resistance associated therewith. In the illustrative embodiment of FIG. 20, the resistance causes the potential of the corresponding electric field to vary linearly along the dimension of the substrate. As with FIG. 19, the step (1907) of polymerizing is performed with the application of ultraviolet light 2008 to the liquid crystal material 2003 while the electric field is being applied.

It has been noted above that the angular separation introduced by the beam separator, and the resulting speckle reduction, inversely affects resolution. In one illustrative design created in accordance with embodiments of the invention, the angular separation desired for the green wavelength is about 1.8 arc minutes. However, for design purposes, there will be some tolerances in the various design specifications that are achieved. To assist the designer in understanding the effects of manufacturing tolerances associated with developing beam separators in accordance with embodiments of the invention, FIGS. 6-9 illustrate how a tolerance of plus or minus ten percent affects beam growth, speckle reduction, raster modulation, and line on-line off contrast, respectively, where a birefringent material is used in accordance with the illustrative embodiment.

Figure 6:
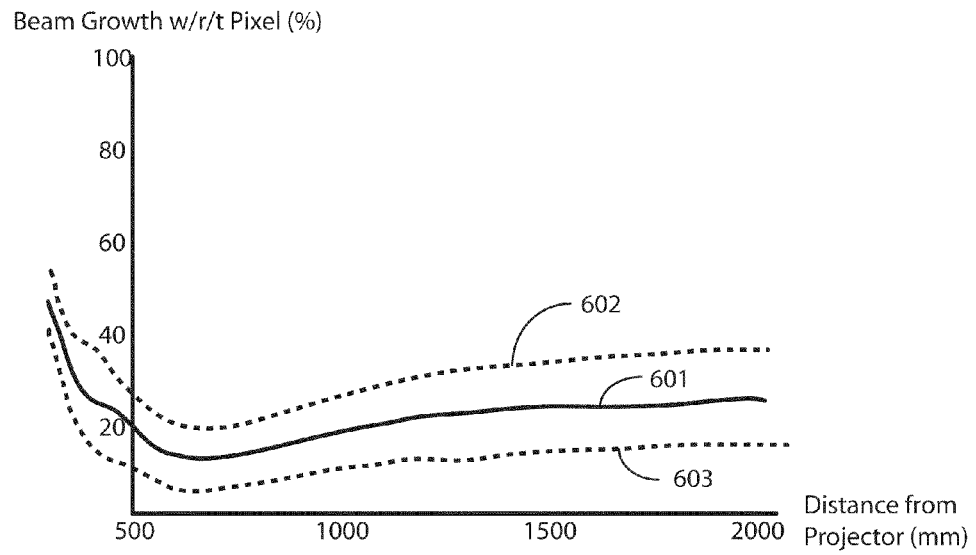
FIG. 6 illustrates a plot of simulated beam growth versus distance from a laser projection source, where that laser projection source employs a birefringent material in accordance with embodiments of the invention.

Turning first to FIG. 6, illustrated therein is a plot of beam growth, with respect to pixel size, expressed as a percentage, versus distance from a laser projection system employing a beam separator (221) in accordance with one embodiment of the invention. Plot 601 illustrates a nominal beam growth when employing an angular separation of 1.8 arc radians as created by the beam separator (221). Plot 602 illustrates beam growth when the tolerances associated with the beam separator (221) are increased by ten percent. Plot 603 illustrates beam growth when the tolerances associated with the beam separator (221) are decreased by ten percent.

Figure 7:
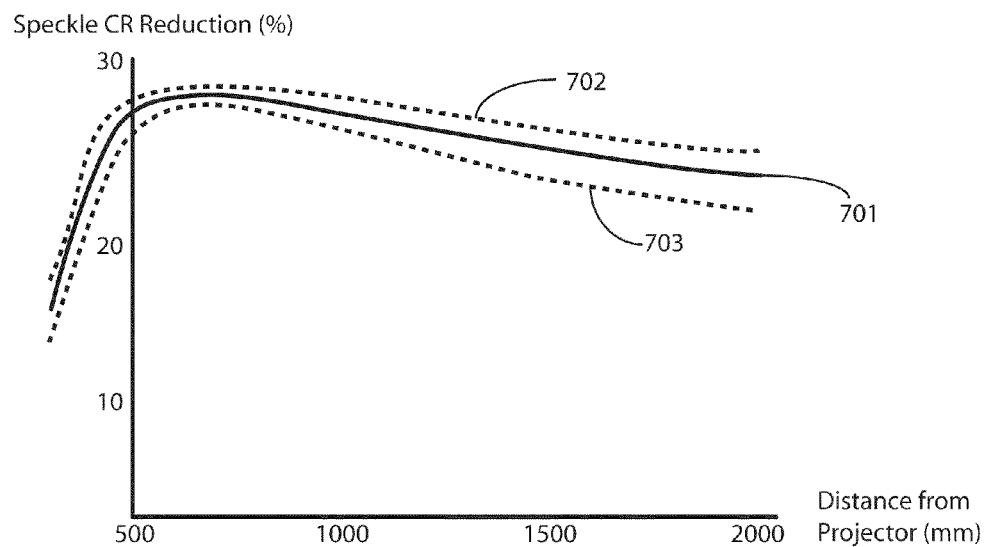
FIG. 7 illustrates a plot of simulated speckle reduction from a laser projection source, where that laser projection source employs one embodiment of a birefringent device in accordance with embodiments of the invention.

Turning now to FIG. 7, illustrated therein is a plot of speckle reduction, expressed as a percentage, versus distance from a laser projection system employing a birefringent material in accordance with one embodiment of the invention. Plot 701 illustrates a nominal speckle reduction when employing an angular separation of 1.8 arc radians as created by the birefringent material. Plot 702 illustrates speckle reduction when the tolerances associated with the birefringent material are increased by ten percent. Plot 703 illustrates speckle reduction when the tolerances associated with the birefringent material are decreased by ten percent.

Figure 8:
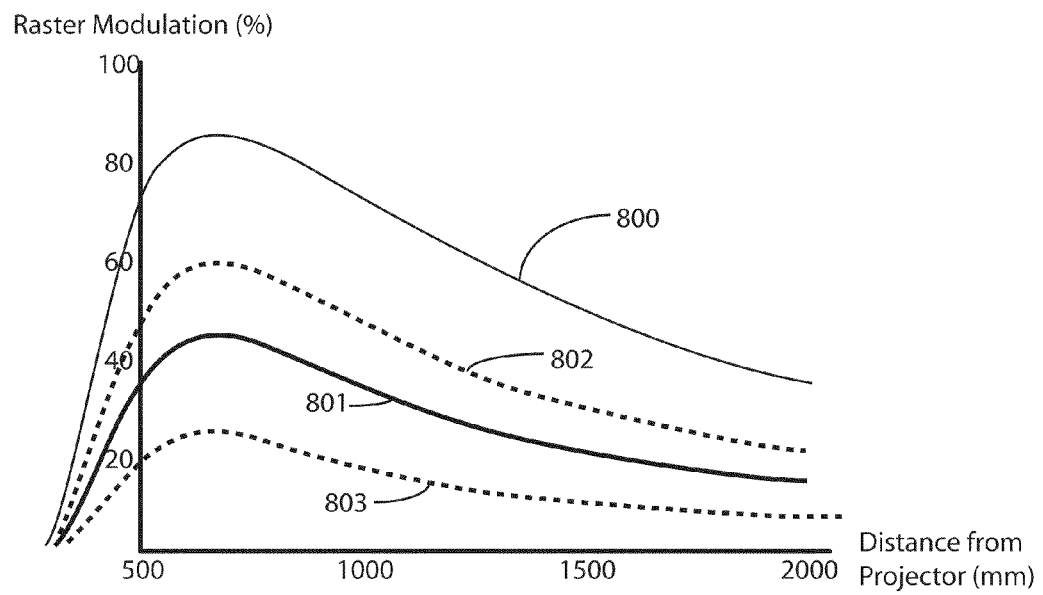
FIG. 8 illustrates a simulated raster modulation improvement from a laser projection source, where that laser projection source employs one embodiment of a birefringent device in accordance with embodiments of the invention.

Turning now to FIG. 8, illustrated therein is a plot of raster modulation, expressed as a percentage, versus distance from a laser projection system employing a birefringent material in accordance with one embodiment of the invention. Plot 800 illustrates the raster modulation in a prior art laser imaging system that employs no birefringent material. Plot 801 illustrates a nominal raster modulation when employing an angular separation of 1.8 arc radians as created by the birefringent material. Plot 802 illustrates raster modulation when the tolerances associated with the beam separator (221) are increased by ten percent. Plot 803 illustrates raster modulation when the tolerances associated with the birefringent material are decreased by ten percent.

Figure 9:
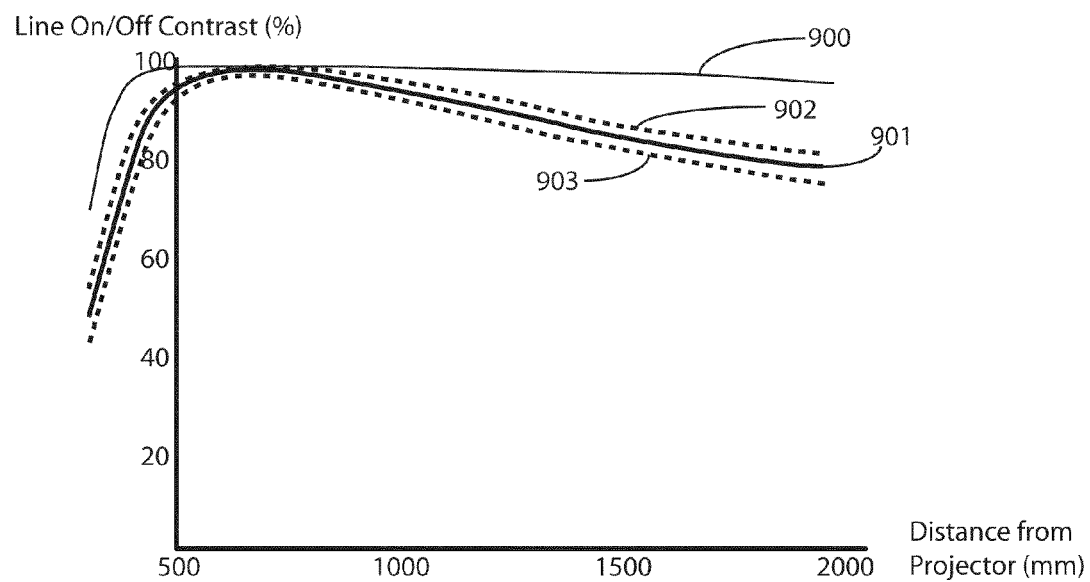
FIG. 9 illustrates a line on-line off contrast impact of a laser projection source, where that laser projection source employs one embodiment of a beam separator in accordance with embodiments of the invention.

Turning now to FIG. 9, illustrated therein is a plot of line on-line off contrast, expressed as a percentage, versus distance from a laser projection system employing a birefringent material in accordance with one embodiment of the invention. Plot 900 illustrates the line on-line off contrast in a prior art laser imaging system that employs no birefringent material. Plot 901 illustrates a nominal line on-line off contrast when employing an angular separation of 1.8 arc radians as created by the birefringent material. Plot 902 illustrates line on-line off contrast when the tolerances associated with the birefringent material are increased by ten percent. Plot 903 illustrates on-line off contrast when the tolerances associated with the birefringent material are decreased by ten percent.

Figure 10:
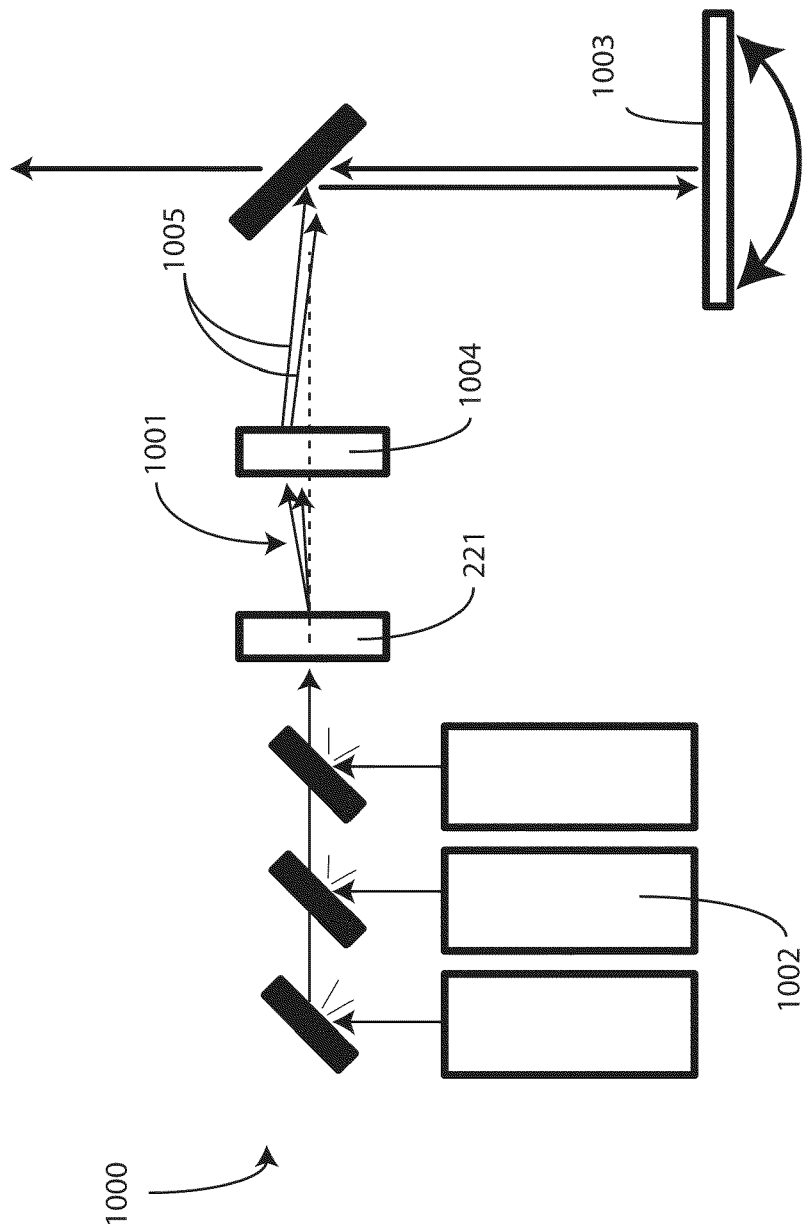
FIG. 10 illustrates one embodiment of a speckle reduction system in accordance with embodiments of the present invention that utilizes a corrective wedge.

Turning now to FIG. 10, illustrated therein is a compensated embodiment of a laser projection system 1000 in accordance with embodiments of the invention. When employing a beam separator 221 configured a birefringent wedge, optical path deviation 1001 can be introduced due to the refraction of the birefringent material or contours of the surfaces of the birefringent wedge. A designer, in one embodiment, can correct for this optical path deviation 1001 by physically reorienting the laser source 1002, the light modulator 1003, and where employed, optical alignment devices.

In another embodiment, rather than having to reconfigure the physical layout of the various components, a designer may employ a compensating, non-birefringent optical redirection component, such as a glass wedge 1004, to correct optical path deviation 1001 introduced by the beam separator 221. The resulting device, as mentioned above, is a compensated birefringent wedge. In one embodiment, the glass wedge 1004 is manufactured from a material such as borosilicate crown glass, and is used to redirect the angularly separated beams 1005 leaving the beam separator 221 back to the light modulator 1003. The glass wedge 1004 can also help to prevent clipping artifacts in the resulting image. In one embodiment, the glass wedge 1004 is disposed between the beam separator 221 and the light modulator 1003. In another embodiment, where optical alignment devices are used, and where the birefringent wedge is disposed between an optical alignment device and a laser source, the glass wedge 1004 can be disposed between the birefringent wedge and the optical alignment device. In yet another embodiment, the glass wedge can be positioned between the birefringent wedge and the laser source.

As with the beam separator 221, the compensating element can be designed, tailored, and/or tuned to optimize the correction of optical path deviation 1001 for a particular application, light wavelength, or birefringent wedge design. Further, while a material like crown glass may be used, other materials may also be selected for use in the glass wedge 1004.

In addition to selecting the material and shape of the glass wedge 1004, the physical relationship of the glass wedge 1004 relative to the beam separator 221 can also be optimized where the beam separator 221 is a birefringent wedge. Specifically, the relationship can be optimized according to dispersion caused by the birefringent wedge to correct for some chromatic differential steering effects. Turning now to FIGS. 11 and 12, illustrated therein are two possible physical relationships between the glass wedge 1004 and the beam separator 221 configured as a birefringent wedge in accordance with embodiments of the invention.

As shown in FIG. 11, in one embodiment the beam separator 221 and glass wedge 1004 are disposed such that they are separated by an air gap 1101. In separating the beam separator 221 and glass wedge 1004 by an air gap, each component can be manufactured as an individual part. For example, the beam separator 221 can be ordered from a first supplier, while the glass wedge 1004 can be ordered from a second supplier, and so forth.

When separating the beam separator 221 from the glass wedge 1004 with an air gap, it may be necessary to apply coatings to one or both components. For example, in one embodiment the glass wedge 1004 is coated with an antireflective coating 1102. Other coatings may be applied as required by a particular application.

In the embodiment of FIG. 11, four major faces must be aligned. The major faces of the beam separator 221 must be properly aligned by the manufacturer. Similarly, the major faces of the glass wedge 1004 must be properly aligned by its manufacturer. Further, each of the beam separator 221 and glass wedge 1004 must be aligned within a laser projection system. Turning now to FIG. 12, illustrated therein is another configuration of the beam separator 221 configured as a birefringent wedge and a glass wedge 1004 in accordance with the invention that reduces some of the alignment and coating requirements.

In FIG. 12, the beam separator 221 and glass wedge 1004 are physically coupled together. The beam separator 221 and glass wedge 1004 may be coupled together, for example, by an optically non-interfering adhesive. Alternatively, the beam separator 221 and glass wedge 1004 may be coupled together by an optical bonding process. The embodiment of FIG. 12, while slightly more complicated in initial manufacture, relieves the laser imaging system manufacturer of some of the alignment constraints associated with the embodiment of FIG. 11.

As mentioned above, embodiments of the invention employing birefringent wedges, compensated birefringent wedges, or polymerized liquid crystal layers to reduce speckle are suitable for use with other speckle reduction techniques. As described above, by using a single birefringent wedge, compensated birefringent wedge, or polymerized liquid crystal layer optimized for the green wavelength in a laser projection system employing red, green, and blue lasers, a speckle reduction of over twenty percent can be achieved. However, with the application of other speckle reduction techniques, the effective speckle reduction can approach fifty percent or better.

Figure 13:
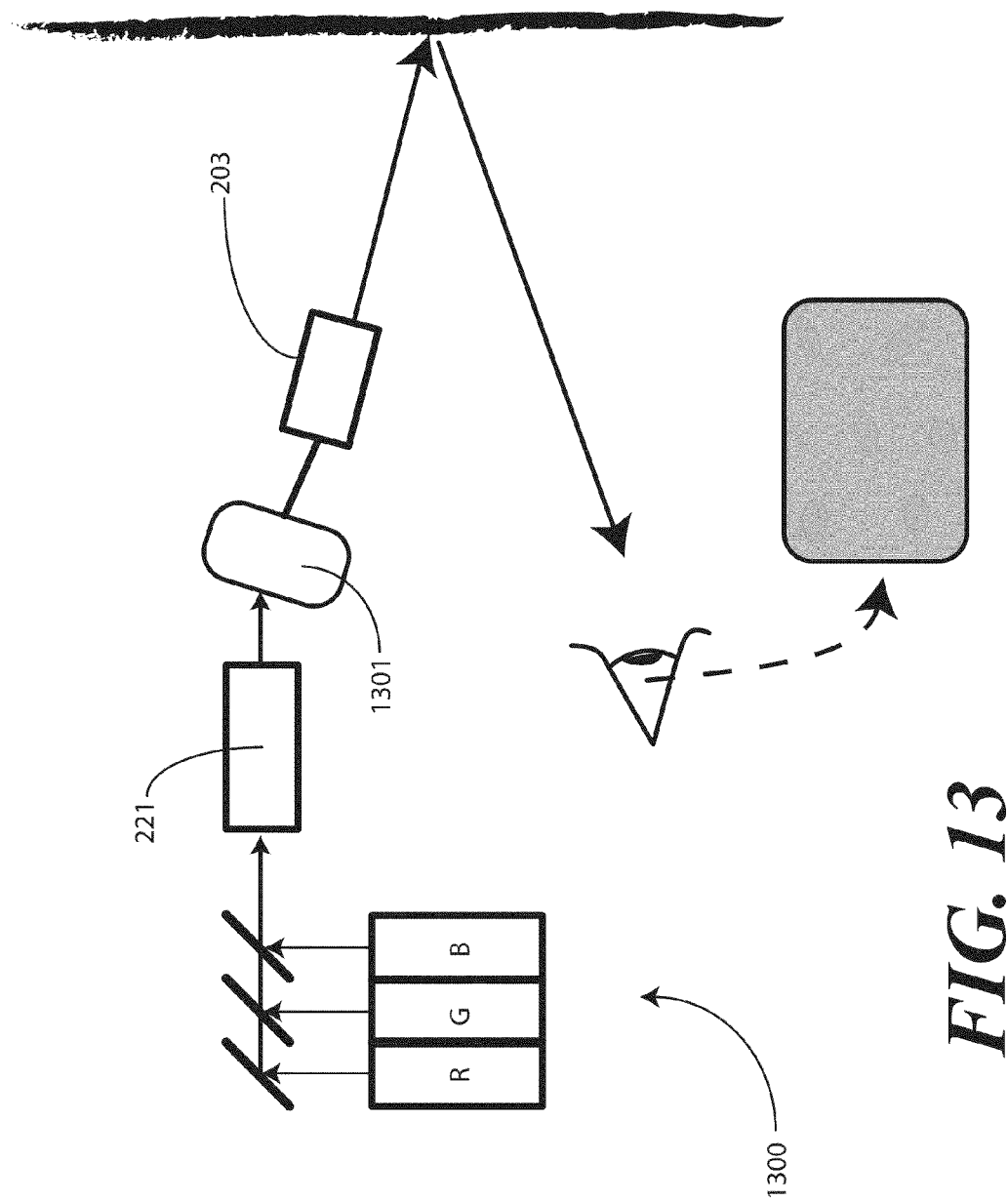
FIG. 13 illustrates another embodiment of a speckle reduction system in accordance with embodiments of the present invention.

Turning now to FIG. 13, illustrated therein is one embodiment of a laser projection system 1300 employing a second speckle reduction device 1301 in conjunction with a beam separator 221 to further reduce speckle. In one embodiment, the second speckle reduction device 1301 is a temporal image-averaging device configured to generate uncorrelated speckle patterns at the screen for each consecutive frame. As with embodiments described above, the beam separator may be used with a compensating non-birefringent element.

The second speckle reduction device 1301 can take many forms. For example, in one embodiment it can be a rotating diffuser that temporally averages successive images created by the light modulator 203. While represented in FIG. 13 as a device occurring after the beam separator 221, it will be clear to those of ordinary skill in the art having the benefit of this disclosure that other devices may also be used. For example, a laser projection system using a beam separator 221 in accordance with embodiments of the present invention can be used with other modules or devices configured to alter successive frames of the images created by the light modulator 203, such as polarization switching modules, transverse phase modulation modules, static pseudo random couple phase modulation devices, or laser sources that are driven by high speed modulation devices.

As has been shown and described herein, embodiments of the invention provide a light projection source that includes a laser light source and a light modulator configured to produce images from light received from the laser light source. A birefringent crystal, configured as a wedge, or alternatively a polymerized liquid crystal layer, is disposed along an optical axis occurring between the laser light source and the light modulator. The birefringent crystal or polymerized liquid crystal layer receives light from the laser light source and delivers two angularly spaced beams to the light modulator. The birefringence of the wedge or polymerized liquid crystal layer causes the two angularly spaced beams to be substantially orthogonal in polarization. Where a birefringent wedge is employed, the birefringent wedge can be used in conjunction with a compensating non-birefringent device as well to form a compensated birefringent wedge. Polymerized liquid crystal layers do not require compensating elements.

In one illustrative embodiment, suitable for use with MEMS scanned laser projection systems, the birefringent wedge, compensated birefringent wedge, or polymerized liquid crystal layer is designed such that the two angularly spaced beams are spaced at a separation angle of between 1.5 and 2.0 arc minutes. Such a design provides a passive optical system capable of achieving at least a twenty percent reduction in speckle with very limited impact to image quality, and without losing any of the advantages MEMS laser projection technology. These advantages include a very long depth of focus, small form factor, and brightness on the order of ten lumens emitted. Further, this design is readily manufacturable at a reasonable cost.

In one embodiment, where a birefringent wedge is employed, the birefringent wedge is configured with a first major face being oriented at an angle of between 3.9 and 4.1 degrees relative to a second major face. In one embodiment, the birefringent wedge is disposed within a laser projection system such that received light impinges the birefringent wedge at an incident angle of between 61.5 and 67.5 degrees relative to a birefringent crystal optical axis.

In another embodiment, where a polymerized liquid crystal layer is used, the polymerized liquid crystal layer includes a liquid crystal material in which the rod-like molecules are oriented across a major face of the polymerized liquid crystal layer such that a rotational orientation varies in accordance with the function, which is monotonic and can be linear or non-linear, increasing or decreasing.

In some embodiments, optical alignment devices are used to direct light from laser projection sources to a light modulator. In one embodiment, the birefringent wedge, compensated birefringent wedge, or polymerized liquid crystal layer is disposed between the optical alignment device and the light modulator.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system, comprising:
   one or more laser sources configured to produce one or more light beams;
   a light modulator configured to produce images with the one or more light beams; and
   a polymerized liquid crystal layer that is one of:
      disposed between at least one of the one or more laser sources and the light modulator and configured to receive light from the at least one of the one or more laser sources and deliver two angularly separated light beams to the light modulator so as to reduce speckle appearing when the images are displayed on a display surface; or
      disposed between the light modulator and the display surface so as to reduce the speckle appearing when the images are displayed on the display surface, wherein the polymerized liquid crystal layer comprises a plurality of mesogens, each mesogen oriented in accordance with a function that varies monotonically along a dimension across a major face of the polymerized liquid crystal layer such that an index of refraction of the polymerized liquid crystal layer changes monotonically along the dimension.

2. The imaging system of claim 1, wherein the function is expressed with a variable x, as f(x), wherein f(x) comprises one of a linear monotonically increasing function, a non-linear monotonically increasing function, a linear monotonically decreasing function, or a non-linear monotonically decreasing function.

3. The imaging system of claim 2, wherein f(x) varies linearly such that the index of refraction, expressed as n(x), varies non-linearly.

4. The imaging system of claim 3, wherein f(x) varies within a range of 90 degrees along the dimension.

5. The imaging system of claim 3, wherein a projection region is defined by a portion of the polymerized liquid crystal layer through which the one or more laser sources project light, wherein the index of refraction, n(x), in the projection region approximates a linear function.

6. The imaging system of claim 1, wherein the plurality of mesogens is disposed on a substrate, wherein the plurality of mesogens comprises rod-like molecules oriented substantially parallel with the substrate.

7. The imaging system of claim 1, wherein each of the plurality of mesogens is disposed on a substrate, wherein the plurality of mesogens comprises rod-like molecules oriented substantially orthogonal with the substrate at a first end, and being oriented at increasingly acute angles relative to the substrate along the dimension.

8. The imaging system of claim 1, wherein the two angularly separated light beams are separated by an angle of between 1.5 and 2.0 arc minutes.

9. The imaging system of claim 8, further comprising one or more optical alignment devices configured to orient the one or more light beams into a combined light beam, wherein the polymerized liquid crystal layer is disposed between the one or more optical alignment devices and the light modulator.

10. A method of manufacturing a polymerized liquid crystal layer for use in laser scanned projection systems, comprising:
depositing a liquid crystal material comprising a plurality of rod-like molecules on a substrate;
orienting the plurality of rod-like molecules in accordance with a function that varies monotonically along a dimension across a major face of the substrate such that an index of refraction associated with the liquid crystal material varies monotonically along the dimension; and
polymerizing the liquid crystal material so as to fix orientations of the plurality of rod-like molecules in accordance with the function.

11. The method of claim 10, wherein the orienting and polymerizing comprise:
providing a rotating linear polarizer;
providing a slit-mask;
causing the rotating linear polarizer; and
projecting ultraviolet light through the rotating linear polarizer such that the ultraviolet light passes through a slit defined by the slit-mask and intersects the liquid crystal material.

12. The method of claim 11, further comprising moving the substrate laterally beneath the slit-mask while the ultraviolet light passes through the slit.

13. The method of claim 10, wherein orienting comprises:
applying an electric field to the liquid crystal material, wherein a potential of the electric field varies along the dimension in accordance with the function.

14. The method of claim 13, wherein the polymerizing comprises applying ultraviolet light to the liquid crystal material while the electric field is being applied to the liquid crystal material.

15. A light projection source, comprising:
a laser light source;
a light modulator configured to produce images from light received from the laser light source; and
a beam separator, the beam separator having an index of refraction that varies non-linearly and monotonically across its width, disposed along an optical axis occurring between the laser light source and the light modulator, wherein the beam separator receives the light and delivers two angularly spaced beams to the light modulator, wherein the beam separator comprises a polymerized liquid crystal layer having a plurality of rod-like mesogens each oriented in accordance with a rotation function expressed as a function of x, f(x), that varies linearly along the width.

\* \* \* \* \*